United States Patent Office 3,443,190
Patented May 6, 1969

3,443,190
CIRCUIT FOR THE TRANSFER OF STORED VOLTAGES
Hans-Martin Christiansen, Munich-Solln, Germany, assignor to Siemens Aktiengesellschaft, a corporation of Germany
Filed Mar. 1, 1965, Ser. No. 435,830
Claims priority, application Germany, Mar. 5, 1964, S 89,856
Int. Cl. H02j 5/00; H03k 3/00, 17/60
U.S. Cl. 320—1                                13 Claims

ABSTRACT OF THE DISCLOSURE

A circuit for use in electrical signal and measuring technology in which a first potential source storage unit is connected to a second storage unit over a current amplifier having a low-ohmic input and a high-ohmic output and where a switch is present so that a controlled transfer of energy from the first storage unit to the second can be obtained.

---

The invention relates to a circuit for devices, in electrical signaling and measuring technology, for the transfer of the energy content of one storage unit to another storage unit.

Circuits of this type are especially needed in time multiplex systems. It is here essential that the energy of a first storage unit be transferred and stored, as free as possible from losses, into a second storage unit. For this purpose there is suited, for example, the so-called Svalla switch. It has, as a rule, two condensers representing the storers, which are connected over a switch in series with an inductance. The inductance acts, in the closing of the switch, as a momentum reactance. Thereby it is possible, with a certain closing duration of the switch which is determined by the size of the condensers and of the inductance, to completely transfer the charge of the first storage unit into the second storage unit. The maintenance of the conditions requisite for the functioning of the Svalla switch, however, restricts its use to a considerable degree. A circuit which does not have this limitation and, moreover, makes it possible to simultaneously amplify the energy to be transferred is provided with an amplifier, disposed between the two condensers, which has a very high input resistance and a low output resistance. In this circuit, the second condenser is first charged, over a switch allocated to it to the voltage of the first condenser. Thereupon, the connection between the first and the second condenser is broken and the first condenser is discharged over another switch allocated to it. The amplifier, functioning as an impedance transformer, can easily be realized with tubes. Its construction with transistors, however, involves a considerable expenditure.

The invention has as its problem that of producing a recharging circuit of the general type described in the introduction, and which likewise permits a general use, but can be constructed in respect to its transistorizing, among other things, with considerably simpler means.

Proceeding from a circuit for devices, in electric signaling and measuring technology, consisting of a first storage unit which is connected with a second storage unit over an impedance transformer and a switching device controlling the charging process of the first storer, as well as the transfer process between the storage units, the problem is solved according to the invention by an arrangement wherein the impedance transformer is an amplifier with a current amplification, preferably one in which the low-ohmic amplifier input is connectable in series with the first storer and the high-ohmic amplifier output is connectable in parallel with the second storer with the part of the switching system controlling the charge transfer between the storers preferably being an electronic switch which is disposed in parallel to the series circuit of the first storer and the low-ohmic input of the amplifier.

Through the series circuit according to the invention of the first storer with the low-ohmic input of an amplifier having a high-ohmic output, it is achieved that the amplifier may consist of a single transistor. Here there is taken as a starting point the concept that the discharging current of the first condenser can be very precisely fed, over a suitably dimensioned transistor, to the second condenser.

In a preferred embodiment of the invention, the amplifier consists of a transistor in emitter-base circuit. The desired current amplification, which, if no amplification is to take place in the charge transfer of the storers, must have the value of one, is derived with the aid of two suitably dimensioned resistances, of which the one lies in parallel with the control input of the amplifier and the other is arranged in its emitter supply.

The defined charging at least of the first storer can, despite its series circuit with the control input of the transistor, take place in a simple manner without a double switch through the feature that a rectifier is allocated to the storer which during the charging process connects the storer to the reference potential of the source supplying it.

For the withdrawal of the charge from the second storage unit expediently there is provided a switch, preferably electronic, over which the collector-reference voltage is fed to the transistor.

In a further development of the invention, the circuit can be connected in several successive stages similarly built up among themselves in a chain, in such a way that the second storer of the first stage simultaneously forms the first storer of the second stage. In like manner, the second storer of the second stage simultaneously forms the first storer of the third stage, etc. Such a chain circuit is in an extremely advantageous manner suitable for the transmission time lag of a pulse amplitude modulated signal. For this purpose, the amplitude modulated pulse sequence is preferably fed to the first storer of the first stage over an electronic switch. Further, there are applied to the control inputs of the electronic switches, controlling the charge transfer of the storers, controlimpulse sequences with the sequence frequency of the amplitude modulated pulse sequence. These control impulse sequences are there displaced, according to their stage allocation in ascending order, proceeding from the amplitude modulated pulse sequence, with respect to one another by one pulse width forward in phase.

The number of control impulse sequences can be derived, by means of another further development of the invention, from a single one, by the method that in the switching circuits of the electronic switches, preferably utilizing transistors, and controlling the charge transfer of the storers, in each case the primary winding of a polarity reversing, differentiating transformer is arranged, the secondary winding of which lies in the control circuit of the electronic switch connection of the preceding stage. The external single control impulse sequence to be supplied to all the stages is thereby fed to the control input of the electronic switch of the last stages.

This control impulse sequence can also be simultaneously utilized for the control of the electronic switch at the input side for governing the charging of the first storer of the first stage, through the arrangement that in the switching circuit of the electronic switch controlling the charge transfer of the first storer of the first stage there is likewise provided a polarity reversing, differentiating transformer, the secondary winding of which lies in the control circuit of such electronic switch at the input side.

The transmission time chain according to the invention can also be used advantageously for the transmission time delay of a continuous signal. For this purpose there is connected on the input side of the first storer of the first stage a scanning device which scans the signal with a sequence frequency exceeding the highest signal frequency by a factor of two. The amplitude modulated signal form obtained in this manner and delayed in the chain is converted at the output of the chain, by means of a demodulator, back into its original form. The demodulator may consist, for example, of a discharge circuit, in which the second storer of the last stage is also included and a low pass connected therewith.

In the simplest case, the storage units, aside from the rectifier, may consist in each case of a condenser.

The invention will subsequently be explained in greater detail with the aid of examples of the invention illustrated in the drawing, in which.

Figure 1:
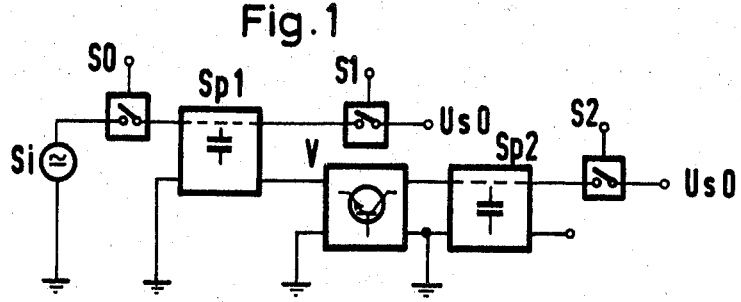
FIG. 1 is a diagram, in block form, of a circuit embodying the invention.

FIG. 1 illustrates in block form, the diagram of a circuit according to the invention. It comprises a first storage unit $Sp1$ which is fed, at the input side, over an electronic switch $So$ from a signal source $Si$. The storage unit $Sp1$ is connected at the output side in series with the low-ohmic input of an amplifier V, in the high-ohmic output of which is disposed a storage unit $Sp2$ having its input connected in parallel therewith. The charge transfer of the energy stored in storer $Sp1$ into the storer $Sp2$ is accomplished by means of the electronic switch S1 which is connected in parallel over a reference voltage $Us0$ to the series circuit from the storer $Sp1$ and the input of amplifier V. The discharge of storer $Sp2$ is accomplished in an analogous manner by means of the electronic switch S2.

Figure 2:
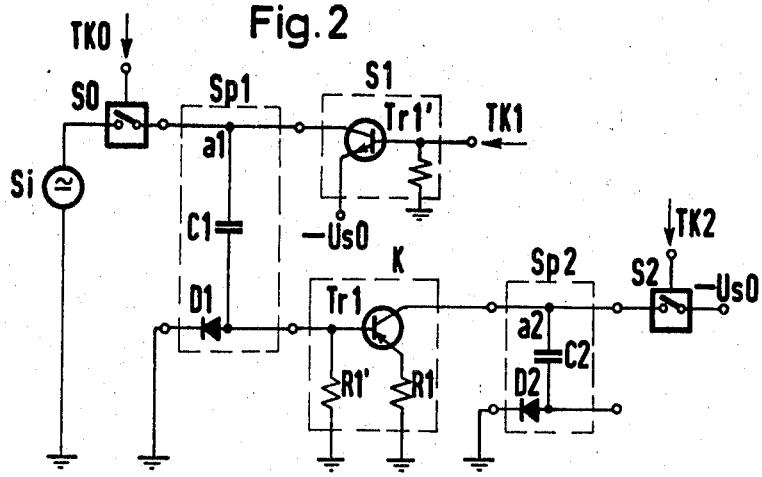
FIG. 2 is a diagram, of a circuit similar to FIG. 1, illustrating a preferred form of the invention.

A preferred example of construction according to the invention is illustrated in FIG. 2. Storers $Sp1$ and $Sp2$, in this embodiment, are simple condensers C1 and C2, which are connected across their respective feeding devices, in each case in series with respective diodes D1 and D2. Diodes D1 and D2 are so poled in flow direction for the devices feeding the condensers C1 that the lower side of the condenser, as viewed in FIG. 2, lies on reference potential. The amplifier K is constructed in the form of a transistor $Tr1$ in emitter-base circuit. The resistor $R1'$, which is connected in parallel with the control input of the transistor, and the resistor R1 in the emitter feed are so dimensioned that the circuit has a current amplification of the value one. The electronic switches S0, S1 and S2 are constructed with switching transistors. For the sake of simplicity, only the switch S1 is illustrated in detail. Its switching transistor $Tr1'$ is likewise emitter-base circuited and lies with its emitter terminal on the negative reference voltage $Us0$. On the control inputs of the electronic switches there lie the control impulse sequences TK0, TK1 and TK2.

Figure 3:
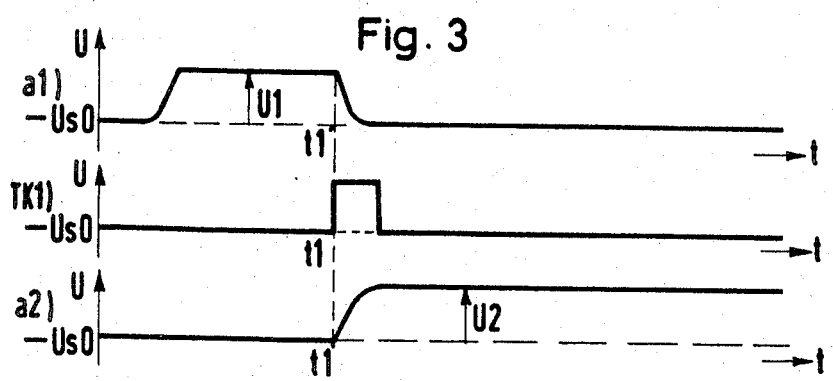
FIG. 3 illustrates the main voltage course at the points $a0$, $a2$ and TK1 of the circuit of FIG. 2.

For a better understanding of the manner of operation, now to be explained, of the inventive concept, in FIG. 3 the most important voltage courses are plotted over time during a charge-discharge operation. Diagram $a1$ depicts the course of the voltage on condenser C1. It has, with respect to the reference potential, first the voltage $Us0$ and, following connection over the switch S0 to the signal source is increased from the reference voltage $-Us0$ by the amount U1, so that the potential of the signal source is applied thereto. At the time point T1, the switching of the transistor $Tr1'$ is initiated. In consequence of a control impulse occurring at its control input, whereby the transistor becomes conductive and the condenser C1 is discharged over the emitter base junction and the resistor $R1'$. The rectifier D1 is blocked during this discharging operation, since the discharge current is poled oppositely to the flow direction of the rectifier. The discharge current which flows through the condenser C1, because of the current amplification of one of the transistors $Tr1$, brings about a current flow across the condenser C2, which in its entire time course, agrees exactly with the discharge current of condenser C1. Since the charge of a condenser is equal to the time interval of the inflowing or outflowing current, accordingly also the charge flowing from condenser C1 must have been received by condenser C2 in the time interval of the discharge operation. The voltage course at condenser C2 is depicted in Diagram $a2$. The amount U2, by which the voltage has been increased during the discharge process of condenser C1 is, therefore, equal to amount U1 (Diagram $a1$) if the condensers C1 and C2, as assumed in the present case are equal. By closing switch S2, the condenser C2 in turn can again be discharged to the reference voltage $-Us0$.

Figure 4:
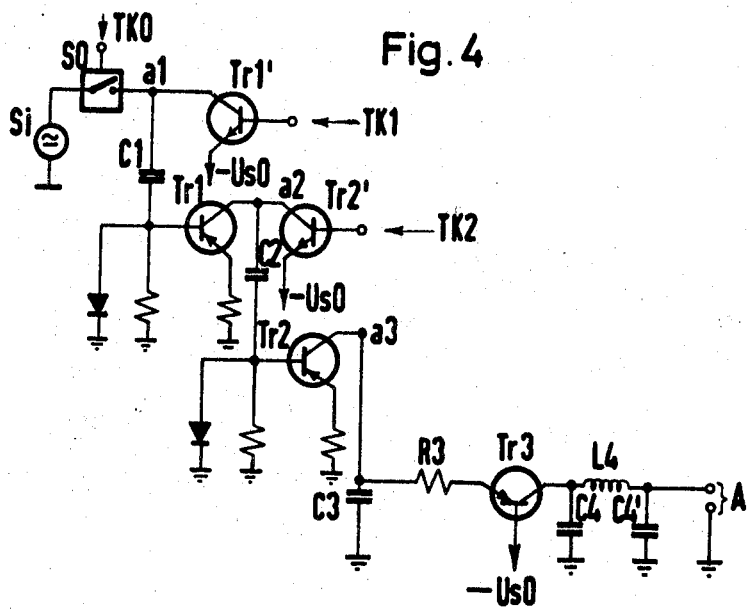
FIG. 4 illustrates a chain circuit embodying the invention.

The field of utilization of the circuit according to the invention, as already mentioned, can also be extended to the transmission time delay of amplitude modulated impulse sequences by the method successively connecting several storage stages in series. With respect to the embodiment according to FIG. 2 this means that to the lower output side terminal of storer $Sp2$ there may be connected an additional amplifier V with an additional storage unit at its output side. In FIG. 4, such a chain is represented for two stages. Obviously, in accordance with the amount of the desired transmission time delay the latter can at will be increased by further stages. The circuit according to FIG. 4 presents in its entirety an arrangement for the time delay of a continuous signal voltage. In distinction from FIG. 2, in FIG. 4 the electronic switch S2 corresponding to switch S1 with its switching transistor $Tr2'$ is also represented. The condenser C2, which represents the second storer of the first stage, simultaneously forms the first storer of the second stage, the amplifier of which comprises the transistor $Tr2$ in emitter base circuit. The second storer of the second stage is formed by the condenser C3. Instead of an additional electronic switch S3, such as would correspond to the switch S2 according to FIG. 2, there is connected in parallel to condenser C3, over the resistor R3, the emitter base junction of transistor $Tr3$, in base circuit. The emitter base junction of this transistor, together with the resistor R3, forms a discharge circuit which is so dimensioned that the condenser C3, in the interval between two charges, can completely discharge to the reference voltage $-Us0$ except for the threshold voltage of the transistor $Tr3$. At the collector side of transistor $Tr3$ there is connected a low pass filler, consisting of the transverse condensers C4 and C4' and the longitudinal inductance L4. The low pass filler filters out the original signal from the sawtooth voltage supplied to it at the input side thereof and makes it available for further use at its output A. For this purpose its limit frequency is selected equal to the highest signal frequency.

The continuous signal at the terminals of signal source $Si$ is scanned, forms a pulse amplitude modulated signal, with the aid of the electronic switch S0 with a sequence frequency which is chosen somewhat greater than twice the highest signal frequency. With this scanning frequency, established by the scanning theorem, the transmission time delay possible per stage is likewise determined.

Figure 5:
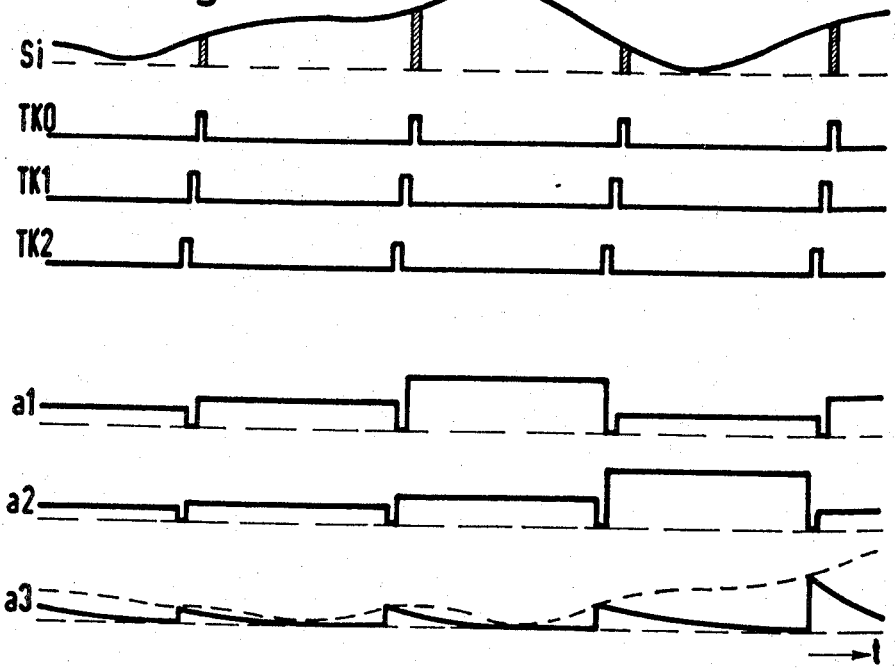
FIG. 5 is similar to FIG. 3, and illustrates the voltage course at the correspondingly designated point of FIG. 4.

The manner of operation of the circuit according to FIG. 4 will be apparent from the diagrams of FIG. 5. The diagrams are in each case provided with an identification reference which appears in FIG. 4 and designates the point of the circuit at which the represented voltage occurs. The switch S0 scans the signal S$i$ in the rhythm of the control impulse sequence TK0 applied to its control input. The scanning samples are indicated in the Diagram S$i$ by cross-hatching. The control impulse sequences TK1 and TK2 for the charge transfer of the condensers show the same sequence frequency as the control impulse sequence TK0 but the control impulse sequence TK1 is shifted forward in place with respect to the control impulse sequence TK0 by one pulse width. The same holds true for the control impulse sequence TK2 with respect to the control impulse sequence TK1. On closing of the switch S0, the condenser C1 is charged, in each case to the momentary value of the signal voltage S$i$. It retains this value until the next impulse of the control impulse sequence T$k$1 which makes the switching junction of the switching transistor T$r$1' conductive and through the discharge process thereby initiated, the charge stored in condenser C1 is delivered to the condenser C2. The condenser C1 is immediately thereupon charged over the switch S0 to a new momentary value of signal S$i$. The condenser C2 again retains, in a stable manner, the charge conveyed to it from condenser C1, until after expiration of a brief pulse period, the switching junction of the switching transistor T$r$2' is made conductive by the control impulse sequence TK2 and thereby its charge is transferred to the condenser C3. The scanning values of the signal voltage S$i$ are thus twice delayed by a time interval which in first approximation corresponds to twice the period duration of the control impulse sequences. The condenser C3 in turn discharges steadily over the emitter collector junction of the transistor T$r$3. The original signal voltage derived from this sawtooth voltage at the output A of the low pass filter is plotted in Diagram $a$3 of FIG. 5 in the form of the broken line.

The scanning device at the input of the delay chain and the demodulator at the output of the second storer of the last stage may, of course, be dispensed with if the signal to be delayed is originally pulse amplitude modulated and is to continue to exist in this form after its delay. As a rule, however, it would probably be here expedient to feed the impulses to the first storer of the first stage over an electronic switch.

Figure 6:
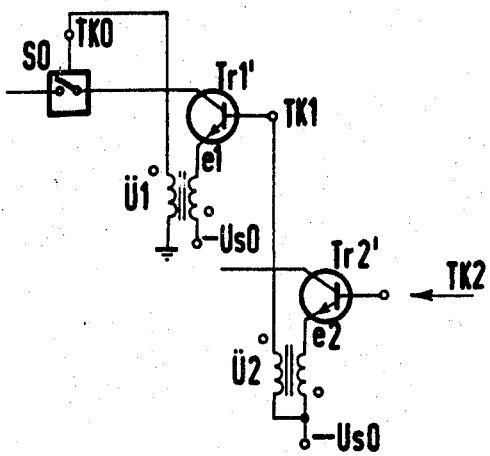
FIG. 6 illustrates the use of polarity reversing transformers in a chain circuit similar to that illustrated in FIG. 4; and, FIG. 7 illustrates, the voltage course at its correspondingly designated point of FIG. 6.

The control of the electronic switch at the input side of the scanning device, as well as of the switches controlling the charge transfer between the storage units may be derived in a simple manner by the use of polarity reversing, differentiating transformers in the control paths of the respective switching transistors from a signal control impulse sequence. In FIG. 6, this circuit modification is illustrated for a two-stage chain according to FIG. 4. In the latter, the representation of the transistors T$r$1, T$r$2 and T$r$3 was omitted. As illustrated in FIG. 6, in the emitter branch of each of the switching transistors T$r$1' and T$r$2' effecting the charge transfer there is arranged the primary winding, a polarity reversing, differentiating transformer U1 and U2. The secondary winding of transformer U2 is arranged in the control current circuit of the switching transistor T$r$1' and the secondary winding of the transformer U1 is arranged in the control current circuit of the switch S0. Instead of three control impulse sequences there is now fed to the control input of only the switching transistor T$r$2', the control impulse sequence TK2.

Figure 7:
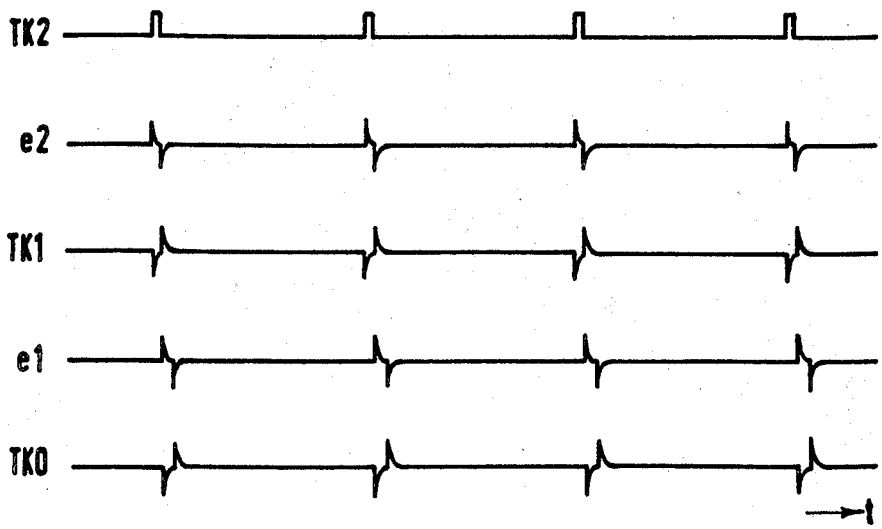

In FIG. 7 in the individual diagrams, successive transmission time voltage processes are plotted over time. The control impulse sequence TK2 appears at the emitter $e$2 of transistor T$r$2' in the form of a bipolar impulse sequence obtained by differentiation of the impulse flanks. Through the polarity reversal the bipolar impulse sequence $e$2 is effective as control pulse sequence TK1 at the control input of transistor T$r$1', in each case, however, not until a time point at which the corresponding impulses of the control impulse sequence TK2 have previously been completed. The same holds for the differentiated impulses at the emitter $e$1 of transistor T$r$1' and the control impulse sequence obtained from this with respect to the control impulse sequence TK1.

Changes may be made within the scope and spirit of the appended claims which define what is believed to be new and desired to have protected by Letters Patent.

I claim:

1. A circuit arrangement for the discharge and transfer of energy in systems for electrical signalling and measuring technology comprising:
   a reference potential,
   first storage means,
   second storage means,
   circuit means for controlling said discharge and transfer of energy between said first storage means and said second storage means,
   said circuit means including impedance converter means for determining the energy balance during said discharge and transfer of energy,
   said impedance converter means including an amplifier having a low-impedance input connected in series to said first storage means and a high-impedance output connected in parallel to said second storage means, and
   said circuit means including a switch serially connecting said first storage means and said low-impedance input of said amplifier to said reference potential.

2. A circuit arrangement according to claim 1, further characterized by said switch being an electronic switch.

3. A circuit arrangement as defined in claim 1, and further characterized by said amplifier so constructed as to have an amplification factor equal to 1.

4. A circuit arrangement as defined in claim 1, and further characterized by said amplifier comprising:
   a transistor in emitter-base circuit, and
   two suitably dimensioned resistors, one of which lies in parallel with the control input of the transistor and the other of which is arranged in the emitter feed line thereof, for determining the desired current amplification.

5. A circuit arrangement as defined in claim 4, and further characterized by said circuit means comprising:
   a second switch operatively connected to the collector-side of said transistor, and
   means for supplying said reference voltage to said transistor through said second switch.
   means for supplying said amplitude-modulated signa'

6. A circuit arrangement as defined in claim 1, and futher characterized by said circuit means comprising:
   a rectifier operatively connected to said first storage means for connecting said storage means with reference potential.

7. A circuit arrangement as defined in claim 1, and further characterized by several successive stages arranged in a chain with the second storage means of the first stage simultaneously forming the first storage means of the second stage, and
   the second storage means of the second stage simultaneously forming the first storage means of the third stage.

8. A circuit arrangement as defined in claim 7 for the transmission time delay of a pulse amplitude-modulated signal,
   further characterized by said switch being an electronic switch,
   said amplitude-modulated pulse signal being fed to the first storage means of the first stage over said electronic switch, and
   at the control inputs of the respective electronic switches of the successive stages controlling the discharge and transfer of energy between said first storage means and said second storage means, each control impulse having the same frequency as the amplitude-modulated pulse sequence, with said control impulse sequences being displaced forward in phase by one pulse with respect to one another, in correspondence to their stage allocation in ascending order, proceeding from the amplitude-modulated pulse sequence.

9. A circuit arrangement as defined in claim 8, and further characterized by said electronic switches being transistors having
   a switching path,
   a differentiating transformer having a primary winding and a secondary winding,
   said primary winding lying in said switching path,
   said secondary winding being disposed in the control circuit of the electronic switch of the preceding storage means, and
   said control impulse sequence being supplied only to the control input of the electronic switch for the last stage.

10. A circuit arrangement as defined in claim 8, and further characterized by a polarity-reversing differentiating transformer being disposed in the switching path of the electronic switch controlling the discharge of the first storage means of the first stage, and
    the secondary winding of said differentiating transformer disposed in the control circuit of the input electronic switch for the amplitude-modulated impulse sequence.

11. A circuit arrangement as defined in claim 8 comprising:
    a scaning means at the input side of the first storage means,
    said first stage for scanning the signal with a sequence frequency exceeding the highest signal frequency by a factor of two, and
    a demodulator means at the output side of said chain for converting said signal into its original form.

12. A circuit arrangement according to claim 11, and further characterized by said demodulator means having a discharge circuit, said discharge circuit including the second storage means of the last stage, and
    a low-pass filter connected thereto.

13. A circuit arrangement as defined in claim 1, and further characterized by each of said storages being a condenser.

References Cited

UNITED STATES PATENTS

| | | | |
|---|---|---|---|
| 3,047,817 | 7/1962 | Schneider | 328—106 X |
| 3,119,984 | 1/1964 | Brandt et al. | 340—173 |
| 3,253,162 | 5/1966 | Barnes et al. | 307—88.5 |

BERNARD KONICK, *Primary Examiner.*

JOSEPH F. BREIMAYER, *Assistant Examiner.*

U.S. Cl. X.R.

307—246; 328—67, 78; 340—173